United States Patent
Hviid et al.

(10) Patent No.: US 9,949,013 B2
(45) Date of Patent: Apr. 17, 2018

(54) NEAR FIELD GESTURE CONTROL SYSTEM AND METHOD

(71) Applicant: BRAGI GmbH, München (DE)

(72) Inventors: Nikolaj Hviid, München (DE); Friedrich Christian Förstner, München (DE); Eric Christian Hirsch, München (DE)

(73) Assignee: BRAGI GmbH, München (DE)

( * ) Notice: Subject to any disclaimer, the term of this patent is extended or adjusted under 35 U.S.C. 154(b) by 0 days.

(21) Appl. No.: 15/244,917

(22) Filed: Aug. 23, 2016

(65) Prior Publication Data

US 2017/0064432 A1   Mar. 2, 2017

Related U.S. Application Data

(60) Provisional application No. 62/211,728, filed on Aug. 29, 2015.

(51) Int. Cl.
| | |
|---|---|
| *H04R 25/00* | (2006.01) |
| *H04R 1/10* | (2006.01) |
| *G06F 3/01* | (2006.01) |
| *G01J 1/16* | (2006.01) |
| *G06F 3/0354* | (2013.01) |

(52) U.S. Cl.
CPC ............ *H04R 1/1041* (2013.01); *G01J 1/16* (2013.01); *G06F 3/017* (2013.01); *G06F 3/03547* (2013.01); *H04R 2430/01* (2013.01)

(58) Field of Classification Search
CPC combination set(s) only.
See application file for complete search history.

(56) References Cited

U.S. PATENT DOCUMENTS

| | | |
|---|---|---|
| 3,934,100 A | 1/1976 | Harada |
| 4,150,262 A | 4/1979 | Ono |
| 4,334,315 A | 6/1982 | Ono et al. |
| 4,375,016 A | 2/1983 | Harada |
| 4,588,867 A | 5/1986 | Konomi |
| 4,654,883 A | 3/1987 | Iwata |
| 4,682,180 A | 7/1987 | Gans |
| 4,791,673 A | 12/1988 | Schreiber |
| 4,865,044 A | 9/1989 | Wallace et al. |
| 5,191,602 A | 3/1993 | Regen et al. |
| 5,201,007 A | 4/1993 | Ward et al. |

(Continued)

FOREIGN PATENT DOCUMENTS

| | | |
|---|---|---|
| EP | 1017252 A2 | 7/2000 |
| GB | 2074817 | 4/1981 |

(Continued)

OTHER PUBLICATIONS

Announcing the $3,333,333 Stretch Goal (Feb. 24, 2014).

(Continued)

*Primary Examiner* — Amir Etesam (74) *Attorney, Agent, or Firm* — Goodhue, Coleman & Owens, P.C.

(57) ABSTRACT

An earpiece includes an earpiece housing, a processor disposed within the earpiece housing, and a gesture based interface operatively connected to the processor and configured to detect changes in an energy field associated with user gestures. The processor is configured to interpret the changes in the energy field to determine the user gestures.

21 Claims, 6 Drawing Sheets

(56) References Cited

U.S. PATENT DOCUMENTS

| | | |
|---|---|---|
| 5,280,524 A | 1/1994 | Norris |
| 5,295,193 A | 3/1994 | Ono |
| 5,298,692 A | 3/1994 | Ikeda et al. |
| 5,343,532 A | 8/1994 | Shugart |
| 5,363,444 A | 11/1994 | Norris |
| 5,497,339 A | 3/1996 | Bernard |
| 5,606,621 A | 2/1997 | Reiter et al. |
| 5,613,222 A | 3/1997 | Guenther |
| 5,692,059 A | 11/1997 | Kruger |
| 5,721,783 A | 2/1998 | Anderson |
| 5,749,072 A | 5/1998 | Mazurkiewicz et al. |
| 5,771,438 A | 6/1998 | Palermo et al. |
| 5,802,167 A | 9/1998 | Hong |
| 5,929,774 A | 7/1999 | Charlton |
| 5,933,506 A | 8/1999 | Aoki et al. |
| 5,949,896 A | 9/1999 | Nageno et al. |
| 5,987,146 A | 11/1999 | Pluvinage et al. |
| 6,021,207 A | 2/2000 | Puthuff et al. |
| 6,054,989 A | 4/2000 | Robertson et al. |
| 6,081,724 A | 6/2000 | Wilson |
| 6,094,492 A | 7/2000 | Boesen |
| 6,111,569 A | 8/2000 | Brusky et al. |
| 6,112,103 A | 8/2000 | Puthuff |
| 6,157,727 A | 12/2000 | Rueda |
| 6,167,039 A | 12/2000 | Karlsson et al. |
| 6,181,801 B1 | 1/2001 | Puthuff et al. |
| 6,208,372 B1 | 3/2001 | Barraclough |
| 6,275,789 B1 | 8/2001 | Moser et al. |
| 6,339,754 B1 | 1/2002 | Flanagan et al. |
| 6,408,081 B1 | 6/2002 | Boesen |
| D464,039 S | 10/2002 | Boesen |
| 6,470,893 B1 | 10/2002 | Boesen |
| D468,299 S | 1/2003 | Boesen |
| D468,300 S | 1/2003 | Boesen |
| 6,542,721 B2 | 4/2003 | Boesen |
| 6,560,468 B1 | 5/2003 | Boesen |
| 6,654,721 B2 | 11/2003 | Handelman |
| 6,664,713 B2 | 12/2003 | Boesen |
| 6,694,180 B1 | 2/2004 | Boesen |
| 6,718,043 B1 | 4/2004 | Boesen |
| 6,738,485 B1 | 5/2004 | Boesen |
| 6,748,095 B1 | 6/2004 | Goss |
| 6,754,358 B1 | 6/2004 | Boesen et al. |
| 6,784,873 B1 | 8/2004 | Boesen et al. |
| 6,823,195 B1 | 11/2004 | Boesen |
| 6,852,084 B1 | 2/2005 | Boesen |
| 6,879,698 B2 | 4/2005 | Boesen |
| 6,892,082 B2 | 5/2005 | Boesen |
| 6,920,229 B2 | 7/2005 | Boesen |
| 6,952,483 B2 | 10/2005 | Boesen et al. |
| 6,987,986 B2 | 1/2006 | Boesen |
| 7,136,282 B1 | 11/2006 | Rebeske |
| 7,203,331 B2 | 4/2007 | Boesen |
| 7,209,569 B2 | 4/2007 | Boesen |
| 7,215,790 B2 | 5/2007 | Boesen et al. |
| 7,463,902 B2 | 12/2008 | Boesen |
| 7,508,411 B2 | 3/2009 | Boesen |
| 7,983,628 B2 | 7/2011 | Boesen |
| 8,140,357 B1 | 3/2012 | Boesen |
| 2001/0005197 A1 | 6/2001 | Mishra et al. |
| 2001/0027121 A1 | 10/2001 | Boesen |
| 2001/0056350 A1 | 12/2001 | Calderone et al. |
| 2002/0002413 A1 | 1/2002 | Tokue |
| 2002/0007510 A1 | 1/2002 | Mann |
| 2002/0010590 A1 | 1/2002 | Lee |
| 2002/0030637 A1 | 3/2002 | Mann |
| 2002/0046035 A1 | 4/2002 | Kitahara et al. |
| 2002/0057810 A1 | 5/2002 | Boesen |
| 2002/0076073 A1 | 6/2002 | Taenzer et al. |
| 2002/0118852 A1 | 8/2002 | Boesen |
| 2003/0065504 A1 | 4/2003 | Kraemer et al. |
| 2003/0100331 A1 | 5/2003 | Dress et al. |
| 2003/0104806 A1 | 6/2003 | Ruef et al. |
| 2003/0115068 A1 | 6/2003 | Boesen |
| 2003/0125096 A1 | 7/2003 | Boesen |
| 2003/0218064 A1 | 11/2003 | Conner et al. |
| 2004/0070564 A1 | 4/2004 | Dawson et al. |
| 2004/0160511 A1 | 8/2004 | Boesen |
| 2005/0043056 A1 | 2/2005 | Boesen |
| 2005/0125320 A1 | 6/2005 | Boesen |
| 2005/0148883 A1 | 7/2005 | Boesen |
| 2005/0165663 A1 | 7/2005 | Razumov |
| 2005/0196009 A1 | 9/2005 | Boesen |
| 2005/0238190 A1* | 10/2005 | Rohrlein .............. H03G 3/04 381/312 |
| 2005/0251455 A1 | 11/2005 | Boesen |
| 2005/0266876 A1 | 12/2005 | Boesen |
| 2006/0029246 A1 | 2/2006 | Boesen |
| 2006/0074671 A1 | 4/2006 | Farmaner et al. |
| 2006/0074808 A1 | 4/2006 | Boesen |
| 2008/0254780 A1 | 10/2008 | Kuhl et al. |
| 2009/0309704 A1* | 12/2009 | Chang .............. H04Q 9/00 340/10.1 |
| 2011/0103448 A1* | 5/2011 | Dahl .............. G01S 7/5273 375/224 |
| 2015/0003651 A1* | 1/2015 | Han .............. H04R 25/50 381/312 |
| 2016/0026255 A1* | 1/2016 | Katz .............. G06K 9/00201 345/156 |

FOREIGN PATENT DOCUMENTS

| | | |
|---|---|---|
| JP | 06292195 | 10/1998 |
| WO | 2014043179 A2 | 3/2014 |
| WO | 2015110577 A1 | 7/2015 |
| WO | 2015110587 A1 | 7/2015 |

OTHER PUBLICATIONS

Bragi Is on Facebook (2014).
Bragi Update—Arrival of Prototype Chassis Parts—More People—Awesomeness (May 13, 2014).
Bragi Update—Chinese New Year, Design Verification, Charging Case, More People, Timeline(Mar. 6, 2015).
Bragi Update—First Sleeves From Prototype Tool—Software Development Kit (Jun. 5, 2014).
Bragi Update—Let's Get Ready to Rumble, a Lot to Be Done Over Christmas (Dec. 22, 2014).
Bragi Update—Memories From April—Update on Progress (Sep. 16, 2014).
Bragi Update—Memories from May—Update on Progress—Sweet (Oct. 13, 2014).
Bragi Update—Memories From One Month Before Kickstarter—Update on Progress (Jul. 10, 2014).
Bragi Update—Memories From the First Month of Kickstarter—Update on Progress (Aug. 1, 2014).
Bragi Update—Memories From the Second Month of Kickstarter—Update on Progress (Aug. 22, 2014).
Bragi Update—New People @Bragi—Prototypes (Jun. 26, 2014).
Bragi Update—Office Tour, Tour to China, Tour to CES (Dec. 11, 2014).
Bragi Update—Status on Wireless, Bits and Pieces, Testing—Oh Yeah, Timeline(Apr. 24, 2015).
Bragi Update—The App Preview, the Charger, the SDK, Bragi Funding and Chinese New Year (Feb. 11, 2015).
Bragi Update—What We Did Over Christmas, Las Vegas & CES (Jan. 19, 2014).
Bragi Update—Years of Development, Moments of Utter Joy and Finishing What We Started(Jun. 5, 2015).
Bragi Update—Alpha 5 and Back to China, Backer Day, on Track(May 16, 2015).
Bragi Update—Beta2 Production and Factory Line(Aug. 20, 2015).
Bragi Update—Certifications, Production, Ramping Up (Nov. 13, 2015).
Bragi Update—Developer Units Shipping and Status(Oct. 5, 2015).
Bragi Update—Developer Units Started Shipping and Status (Oct. 19, 2015).
Bragi Update—Developer Units, Investment, Story and Status(Nov. 2, 2015).

(56) References Cited

OTHER PUBLICATIONS

Bragi Update—Getting Close(Aug. 6, 2014).
Bragi Update—On Track, Design Verification, How It Works and What's Next(Jul. 15, 2015).
Bragi Update—On Track, on Track and Gems Overview (Jun. 24, 2015).
Bragi Update—Status on Wireless, Supply, Timeline and Open House@Bragi(Apr. 1, 2015).
Bragi Update—Unpacking Video, Reviews on Audio Perform and Boy Are We Getting Close(Sep. 10, 2015).
Last Push Before the Kickstarter Campaign Ends on Monday 4pm CET (Mar. 28, 2014).
Staab, Wayne J., et al., "A One-Size Disposable Hearing Aid is Introduced", The Hearing Journal 53(4):36-41) Apr. 2000.
Stretchgoal—It's Your Dash (Feb. 14, 2014).
Stretchgoal—The Carrying Case for the Dash (Feb. 12, 2014).
Stretchgoal—Windows Phone Support (Feb. 17, 2014).
The Dash + The Charging Case & the Bragi News (Feb. 21, 2014).
The Dash—A Word From Our Software, Mechanical and Acoustics Team + An Update (Mar. 11, 2014).
Update From Bragi—$3,000,000—Yipee (Mar. 22, 2014).

\* cited by examiner

NEAR FIELD GESTURE CONTROL SYSTEM AND METHOD

PRIORITY STATEMENT

This application claims priority to U.S. Provisional Patent Application No. 62/211,728, filed Aug. 29, 2015, hereby incorporated by reference in its entirety.

FIELD OF THE INVENTION

The present invention relates to wearable devices such as wireless earpieces. More particularly, but not exclusively, the present invention relates to wearable devices such as wireless earpieces with near field gesture based control.

BACKGROUND OF THE ART

Although various wireless earpieces and wearable devices exist, there has not been widespread adoption due to numerous issues and deficiencies. What is needed is au improved wearable device such as an improved wireless earpiece.

SUMMARY

It is a primary object, feature, or advantage of the present invention to provide a wearable device which provides for detection of a user's gestures.

It is a further object, feature, or advantage to provide an earpiece which detects a user's gestures through an IR LED interface.

It is a still further object, feature, or advantage of the present insertion to provide an earpiece which is impervious to water and high IR environments.

Another object, feature, or advantage of the present invention is to receive user gestures in the form of swipes and determine the directionality of the swipe through algorithmic analysis.

Yet another object, feature, or advantage of the present invention is to provide audio feedback to a user based on interactions with an IR LED control system.

A still further object, feature, or advantage of the present invention is to provide the ability to accommodate "white out" IR situations through the use of an algorithmic reversal of a primary input methodology.

Another object, feature, or advantage of the present invention is to provide ultrasound sensor capability as an input control methodology.

Yet another object, feature, or advantage of the present invention is to provide a user interface that is fully functional even in situations where there is no option for visual interaction with the user.

Another object, feature, or advantage of the present invention is to provide for maximum user benefit in situations where input control is minimal due to physical space limitations.

Yet another object, feature, or advantage of the present invention is to provide a user interface which is functional even when the user and device are completely submerged in water, the user is wearing gloves, or the device is being used in areas of extremely bright sunlight or other types of diverse use conditions.

One or more of these and/or other objects, features, or advantages of the present invention will become apparent from the specification and claims that follow. No single embodiment need provide each and every object, feature, or advantage as different embodiments may have different objects, features, or advantages. Therefore, the invention is not to be limited by or to any object, feature, or advantage set forth herein.

According to one aspect, an earpiece includes an earpiece housing, a processor disposed within the earpiece housing, and a gesture based interface operatively connected to the processor and configured to detect changes in an energy field associated with user gestures. The processor is configured to interpret the changes in the energy field to determine the user gestures. The gesture based interface may include one or more IR LEDs and one or more IR receivers. Alternatively, the earpiece may include one or more ultra sound emitters and one or more ultrasound receivers. Alternative types of energy fields such as radar may also be used instead of light or sound. The user gestures may include swipe gestures. The processor may be further configured to determine directionality of the swipe gestures. The user gestures may include tap gestures, holds, or combinations of gestures. The earpiece may further include a speaker operatively connected to the processor and wherein the processor is configured to provide audio feedback to a user through the speaker. Where the energy field is an infrared light field, the processor may be configured to reverse modes when the infrared light field exceeds a threshold. The processor may also be configured to alter the rate of energy emission upon detection of an object within the field. The earpiece housing may be water resistant or impervious to water to allow a user to swim while wearing the earpiece.

According to another aspect, an earpiece is provided. The earpiece includes an earpiece housing, an infrared (IR) light emitting diode (LED) interface operative connected to the earpiece housing, and a processor disposed within the earpiece housing and operatively connected to the infrared (IR) light emitting diode (LED) interface. The IR LED interface may include at least one IR LED and at least one IR receiver. The processor may be configured to detect user gestures based on changes in infrared light. The earpiece may further include a speaker disposed within the earpiece housing which may be operatively connected to the processor and wherein the processor may be configured to provide audio feedback through the speaker. The earpiece may be configured to detect proximity of an object to the IR LED interface and adjust sampling speed based upon detection of the object. The processor may be configured to reverse modes when infrared light levels are above (or below) a threshold.

According to yet another aspect an earpiece is provided. The earpiece includes an earpiece housing, an ultrasound interface operatively connected to the earpiece housing, and a processor disposed within the earpiece housing and operatively connected to the ultrasound interface. The ultrasound interface may include at least one ultrasound emitter and at least one ultrasound detector. The processor may be configured to detect user gestures based on changes in ultrasound energy. The earpiece may further include a speaker disposed within the earpiece housing and operatively connected to the processor and wherein the processor is configured to provide audio feedback through the speaker. The processor may be configured to detect proximity of an object to the ultrasound interface and adjust sampling speed based upon detection of the object.

According to another aspect an earpiece is provided. The earpiece includes an earpiece housing, a radar interface operatively connected to the earpiece housing, and a processor disposed within the earpiece housing and operatively connected to the radar interface. The radar interface may include at least one radar emitter and at least one radar detector. The processor may be configured to detect user gestures based on changes in radar energy. The earpiece may further include a speaker disposed within the earpiece housing and operatively connected to the processor and wherein the processor is configured to provide audio feedback through the speaker. The processor may be configured to detect proximity of an object to the radar interface and adjust sampling speed based upon detection of the object.

According to another aspect a wearable device is provided. The wearable device includes a wearable device housing, an infrared (IR) light emitting diode (LED) interface operatively connected to the wearable device housing, and a processor disposed within the wearable device housing and operatively connected to the infrared (IR) light emitting diode (LED) interface. The processor is configured to interpret user gestures.

According to another aspect, a method for interacting with a user of a wearable device is provided. The method includes generating an energy field and detecting changes in the energy field associated with interactions of the user of the wearable device with the energy field. The interactions of the user of the wearable device with the energy field may be user gestures. The energy field may be an infrared light field. The method may further include providing audio feedback to the user of the wearable device. The wearable device may be an earpiece.

According to another aspect, an earpiece includes an earpiece housing, at least one speaker and at least one microphone operatively connected to the earpiece housing, an infrared (IR) light emitting diode (LED) interface operatively connected to the earpiece housing, and a processor disposed within the earpiece housing and operatively connected to the infrared (IR) light emitting diode (LED) interface. The IR LED interface comprises at least one IR LED and at least one IR receiver. The processor is configured to detect user gestures based on changes in infrared light. The processor is configured to detect proximity of an object to the IR LED interface and adjust sampling speed based upon detection of the object. The processor is configured to reverse modes when infrared light is above a threshold.

DETAILED DESCRIPTION

Figure 1:
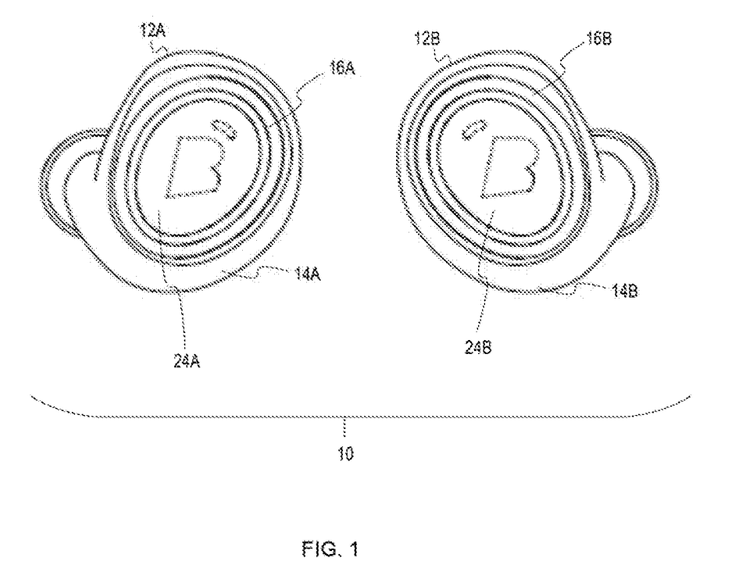
FIG. 1 illustrates a set of earpieces with a gesture based interface.

FIG. 1 illustrates one example of a wearable device in the form of a set of earpieces 10 including a left ear piece 12A and a right earpiece 12B. Each of the ear pieces 12A, 12B has an ear piece housing 14A, 14B which may be in the form of a protective shell or casing. A light display area 16A, 16B is present on each of the ear pieces 12A, 12B. The light generation areas 16A, 16B each provide for producing light of one or more colors.

The wearable device may provide for a plurality of different modes of operation. One mode of operation of the device relate to gestural movements. For example, where a user performs a gestural movement which is interpreted by the device the device may light or activate one or more lighting elements to confirm the gestural movement or to indicate that the gestural movement could not be interpreted. In addition, audio feedback ma be used to confirm a gestural movement or to indicate that the gestural movement could not be interpreted. One or more detectors or receivers 24A, 24B may also be present to detect changes in energy fields associated with gestures performed by a user. The receivers 24A, 24B in combination with one or more emitters provide a gesture based user interface.

Figure 2:
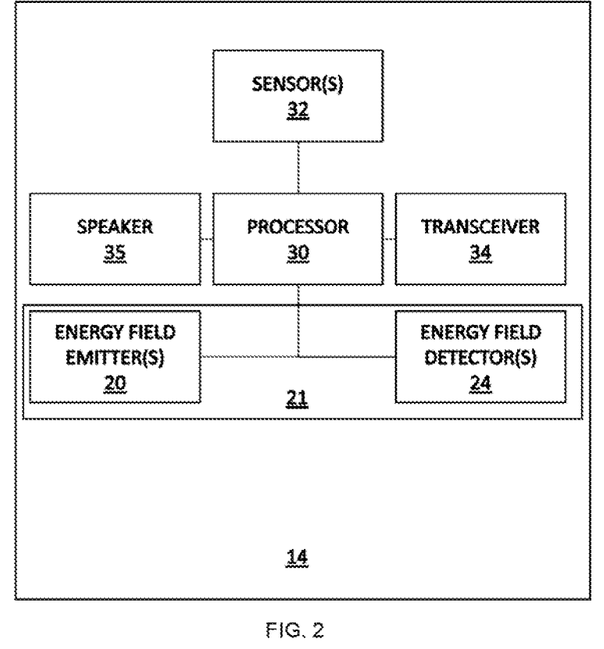
FIG. 2 is a block diagram illustrating a wearable device with a gesture based interface.

FIG. 2 is a block diagram illustrating a device with a housing 14. The device may include a gesture based user interface including one or more energy field emitters and one or more energy field detectors. One or more energy field emitters 20 (such as IR LEDs, other type of light emitters, ultrasound emitters, or other types of sound emitters, or other energy field emitters) may be used. The energy field emitters are operatively connected to the processor 30. It should be understood that interconnecting logic and circuits is not shown. It is to be further understood that the processor shown may include a plurality of different processors or additional circuitry. The processor 30 may also be operatively connected to one or more energy field detectors 24. The energy field detectors may be light detectors, sound detectors or other types of detectors or receivers and not capacitive sensors. For example, wherein the energy field emitters 20 are IR LEDs, the energy field detectors 24 may be IR receivers. The processor 30 may also be electrically connected to one or more sensors 32 (such as, but not limited to an inertial sensor, one or more contact sensors, a bone conduction sensor, one or more microphones, a pulse oximeter, or other biological sensors) and a transceiver 34 such as a short range transceiver using Bluetooth, UWB, magnetic induction, or other means of communication. The processor 30 may also be operatively connected to one or more speakers 35. In operation, the processor 30 may be programed to receive different information using a gesture based user interface including the energy field emitter(s) 20 and the energy field detector(s) 24 based on context or mode of operation of the device. One way in which the processor 30 may determine the relevant mode of operation of the device is from data collected from one or more of the sensor(s) 32. For example, where the device is an earpiece, the sensor(s) may include an inertial sensor, one or more contact sensors, a bone conduction sensor, one or more microphones, a pulse oximeter, or other biological sensors. Thus, based on the status of different sensors, additional information about the mode of operation and the context of input from a user using, the gesture based user interface can be determined.

The wearable device may be a wireless earpiece designed to fit into the external ear and concha cavum segment of the pinna. The system may be responsive in a number of harsh environments. These vary from complete submersion in water to being able to be accessed while wearing gloves, among others. Note that capacitive touch sensors would not be appropriate for these types of use cases.

The wearable device provides a near field control system. Such a system is responsive to the user in multiple environments where current technology physiologic interfaces are incapable of function. Said environments include, but are not limited to situations where the user and device are completely submerged in water, while wearing gloves, in areas of extremely bright sunlight among others. This system may function with no screen for visual feedback expected or anticipated. A vesture based control system may integrate audio signals for transmission of feedback to the individual. Audio based feedback provides a reliable and efficient human/device interface. Such a system requires no tactile feedback.

Figure 3:
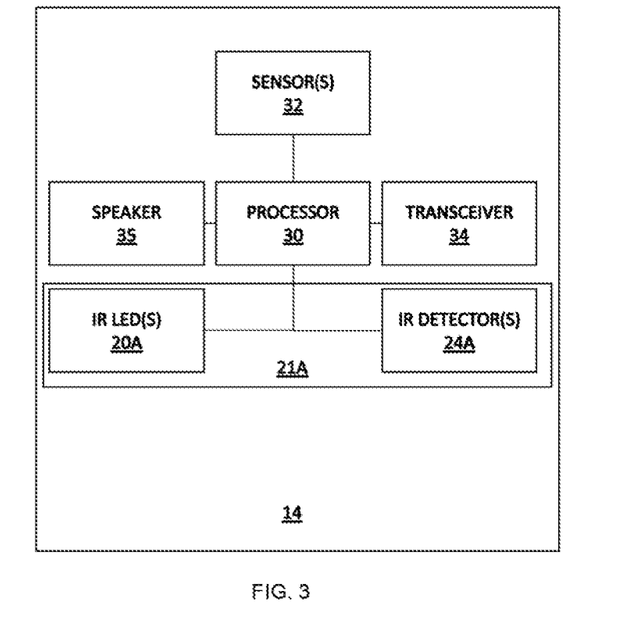
FIG. 3 is a block diagram illustrating a wearable device with an IR LED gesture based interface.

This can be accomplished in a number of ways. As shown in FIG. 3, one embodiment utilizes an optical sensor chip as the detector 24A with associated LEDs 20A as a part of an IR LED interface 21A. These LEDs 20A are spatially segregated. The LEDs 20A are designed so that the user reflects some of the emitted light back to the sensor, if the user gets near the range of the IR, then an action is triggered. In order to allow for precise identification of signal vs. artifact, the preferred embodiment sets the IR emission at a slow rate, e.g. 100 ms intervals. When an object comes within the range of the light emitted, this then triggers an algorithm control for proximity detection, if an object is within the proximity of the one or more LED emitters, the algorithm directs the IR LED emitters to adopt a high sample rate e.g. 4 ms intervals. Reflection patterns can then be read correctly identified as user gestures. The peak proximity at the LED emitter determines the directionality of the swipe, when more than one LED emitter is used. This also allows for more sophisticated levels of user/device interactions such as holds, double taps or combinations of gestures. The system is also able to deactivate the LED emitters if there is a constant lack of feedback signal, such as when the user is wearing a helmet, hat or earmuffs.

Alternately, the system may be designed so that if placed in a position where there is extreme 1$k$ exposure, the converse of the previously described methodology is employed. For example, in a situation such as this, where there is massive IR exposure (such as at a beach or walking on a sunny day through snow), the finger creates a shadow; this is able to be interpreted correctly as opposite input relative to the baseline.

Alternately, the system may be further designed so that use of other sensors may be brought into usage to further clarify and quantify the data presented to the intelligent control. For example, inertial sensor data can be used to further improve the resolution and accuracy of the reading. Such additional features and benefits are not to be limited to the present examples cited.

Figure 4:
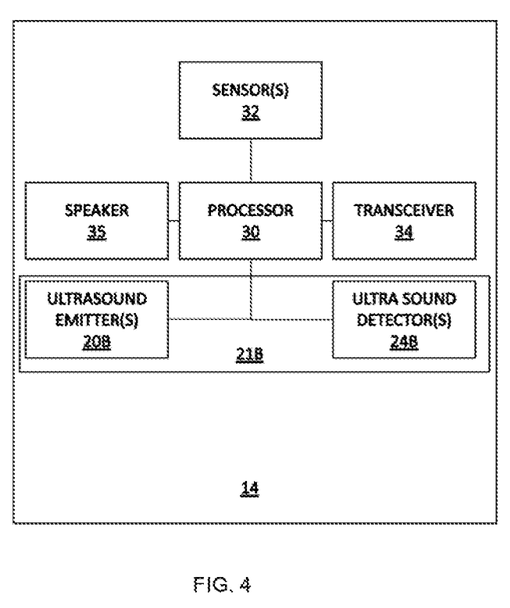
FIG. 4 is a block diagram illustrating a wearable device with an ultrasound gesture based interface.
Figure 5:
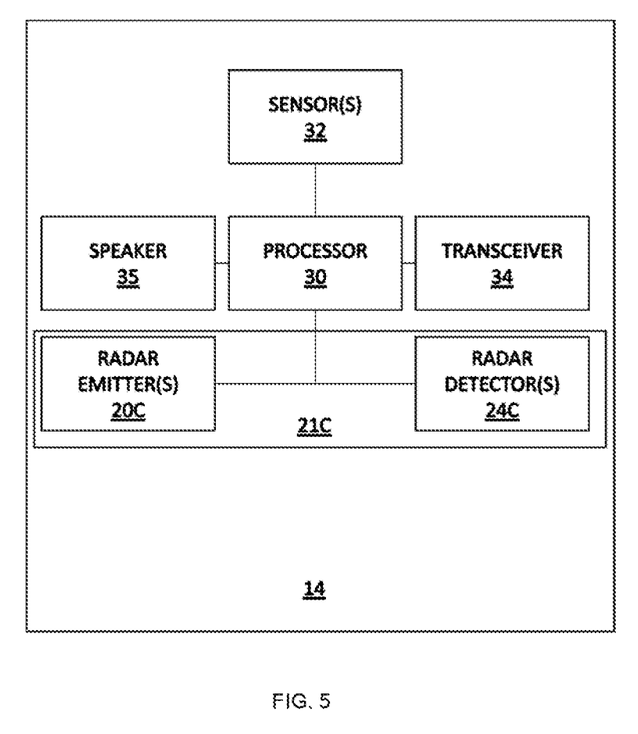
FIG. 5 is a block diagram illustrating a wearable device with a radar gesture based interface.

The system has alternately been constructed using one or more ultrasound sensors, creating a sound wave field in place of the infrared field. As shown in FIG. 4 the interface 21B is an ultrasound interface with ultrasound emitter(s) 20B and ultrasound detector(s) 24B. Therefore, the energy field which is changed due to interactions with the user need not be comprised of light but may also be associated with sound or other types of energy. FIG. 5 illustrates yet another example where the interface 21C is a radar interface with radar emitters 20C and radar detector(s) 24C.

In operation, a user may wear the ear piece. The user may make a gesture near the IR LED interface (or other type of interface). The gesture may be in the form of a tap, a double tap, a triple tap, a swipe (such as a swipe with a particular directionality), a hold, or other gesture. Note that different functionalities may be associated with different gestures and different functionalities may be associated with the same gesture when the device is operating in different modes of operation. Although it is generally preferred that gestures be simple, it is contemplated that complex gestures may be used based on a combination of simple gestures. It is further contemplated that the ear piece may be trained to identify swipes or taps from different fingers of a user. It is further contemplated that swipes or taps of different durations may be interpreted differently. In addition, directionality of User gestures may be used to define the gestures.

It is also contemplated that more than one wearable device may be used. For example, two earpieces may be used each with its own user interface. Where multiple devices are used, it is to be understood that the same gesture performed at one device may be associated with one function while the same gesture performed at the other device may associated with a different function. Alternatively, the same gesture may perform the same function regardless of which device the gesture is performed at.

Figure 6:
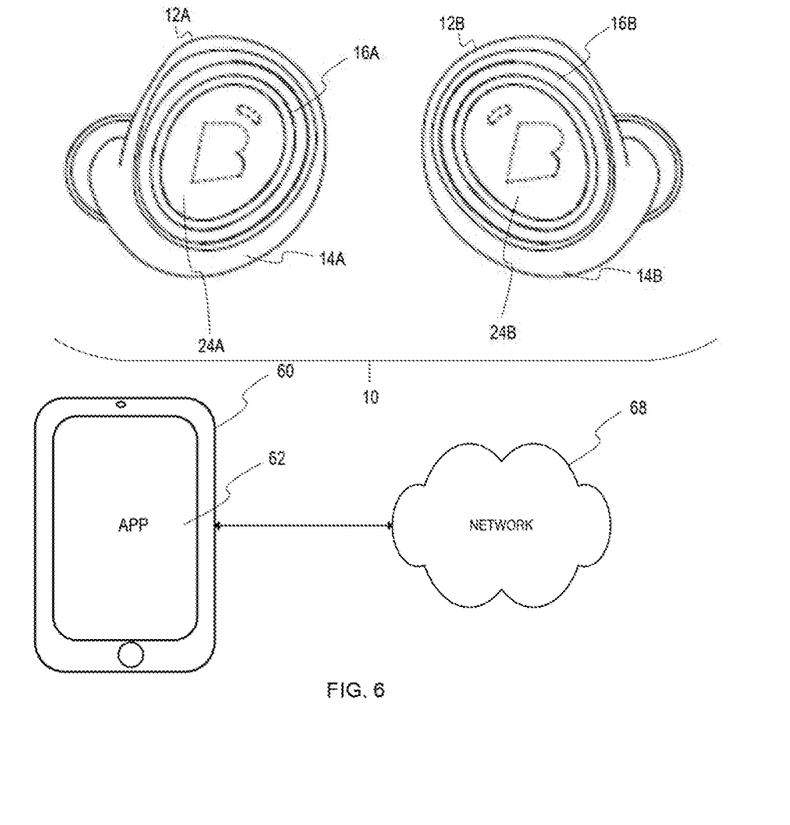
FIG. 6 illustrates a mobile app in communication with wearable devices having gesture based interfaces.

It is further contemplated that audio feedback may be provided to the user in response to gestures made. For example, the audio feedback may simply indicate that the gesture was received or may specify the functionality associated with the gesture. Alternatively, the audio feedback may request additional gestures such as an additional gesture to confirm the gesture previously made or that the function associated with the gesture is to be performed. It is contemplated that whether audio feedback is used or not and/or the type of audio feedback used may be controlled through user settings of the device. For example audio feedback may always be used, or audio feedback may only be used where the confidence level associated with identifying the gesture is not sufficiently high enough, or audio feedback may only be used in certain modes of operation. As shown in FIG. 6, user settings may be changed through the device or through other devices in operative communication with the device such as through a mobile application 62 operating on a mobile device 60 in wireless communication with one or more wearable devices 12A, 12B, each having a gesture-based user interface.

Note that the user interface provides a number of advantages which may be of particular importance. For example, where the device is an ear piece, the ear piece may be resistant or impervious to water. Thus, for example, a user may wear the earpiece while swimming. In such a situation other types of user interfaces such as capacitive touch may not be appropriate. In addition, because as previously explained, when there is massive IR exposure the use of IR may be reversed, the user interface may be used even in high IR environments.

One of the other significant advantages that the gesture based user interface provides is that a user may fully interact with the system even in situations where there is no option for visual interaction with the user. Another significant advantage is that the user interface may be used in situations where input control is minimal due to physical space limitations. A further benefit of the user interface is that voice commands are not required and thus issues associated with voice control can be avoided.

Therefore, various apparatus, systems, and methods have been shown and described. Differences in the type of energy detection, the algorithms used, the gestures used, and other options, variations, and alternatives are contemplated.

What is claimed is:
1. An earpiece comprising:
an earpiece housing;
a processor disposed within the earpiece housing; and
a gesture based interface operatively connected to the processor, wherein the gesture based interface comprises at least one emitter and a detector;
wherein each emitter is configured to emit pulses at a sampling rate;

wherein the detector is configured to sense the pulses reflected off of user gestures;

wherein the processor is configured to execute a proximity detection algorithm in response to a reading of the pulses from the detector to determine a proximity of the user gestures relative to the earpiece; and wherein the processor is further configured to instruct the at least one emitter to increase the sampling rate if the proximity is above a first threshold.

2. The earpiece of claim 1 wherein the at least one emitter comprises at least one infrared (IR) light emitting diode (LED).

3. The earpiece of claim 1 wherein the at least one emitter comprises at least two infrared (IR) light emitting diodes (LEDs).

4. The earpiece of claim 3 wherein the detector comprises an IR receiver.

5. The earpiece of claim 1 wherein the at least one emitter comprises at least one ultra sound emitter.

6. The earpiece of claim 1 wherein the at least one emitter comprises a plurality of ultra sound emitters.

7. The earpiece of claim 6 wherein the detector further comprises an ultra sound receiver.

8. The earpiece of claim 1 wherein the user gestures include a swipe gesture.

9. The earpiece of claim 8 wherein the processor is configured to determine a directionality of the swipe gesture from a peak proximity of the user gestures.

10. The earpiece of claim 1 wherein the user gestures include a tap gesture.

11. The earpiece of claim 9 further comprising a speaker operatively connected to the processor, wherein the processor is further configured to provide audio feedback to a user through the speaker if a confidence level associated with the peak proximity of the swipe gesture is below a second threshold.

12. The earpiece of claim 1 wherein the processor is further configured to reverse modes when the pulses sensed by the detector exceed a threshold.

13. The earpiece of claim 1 wherein the processor is configured to alter a rate of energy emission upon detection of an object.

14. The earpiece of claim 1 wherein the earpiece housing is water impervious to allow a user to swim while wearing the earpiece.

15. The earpiece of claim 1 wherein the at least one emitter comprises a plurality of radar emitters.

16. The earpiece of claim 15 wherein the detector further comprises at least one radar receiver.

17. An earpiece comprising:
an earpiece housing, wherein the earpiece housing is water impervious to allow a user to swim while wearing the earpiece;
a processor disposed within the earpiece housing;
at least one speaker and at least one microphone operatively connected to the earpiece housing and the processor; and
an infrared (IR) light emitting diode (LED) interface operatively connected to the earpiece housing and the processor;
wherein the IR LED interface comprises at least one IR LED and at least one IR receiver;
wherein each IR LED is configured to emit infrared pulses at a sampling rate;
wherein each IR receiver is configured to sense the infrared pulses reflected off of user gestures;
wherein the processor is configured to execute a proximity detection algorithm in response to a reading of the infrared pulses from the IR receiver to determine a proximity of the user gestures relative to the earpiece; and
wherein the processor is further configured to instruct the at least one IR LED to increase the sampling rate if the proximity is above a threshold; and
wherein the processor is further configured to determine a directionality of the user gestures from a peak proximity of the user gestures.

18. The earpiece of claim 17 wherein the processor is configured to reverse modes when the infrared pulses sensed by the at least one IR receiver is above a threshold.

19. The earpiece of claim 1 further comprising an inertial sensor operatively connected to the earpiece housing and the processor, wherein inertial sensor data sensed by the inertial sensor is used in determining the proximity of the user gestures relative to the earpiece by the processor.

20. The earpiece of claim 17 further comprising an inertial sensor operatively connected to the earpiece housing and the processor, wherein inertial sensor data sensed by the inertial sensor is used in determining the proximity of the user gestures relative to the earpiece by the processor.

21. The earpiece of claim 11 wherein the audio feedback further comprises an additional request associated with the swipe gesture.

* * * * *